April 5, 1927.  H. SAUVEUR  1,623,705

CHUCK

Filed May 7, 1925

Inventor
H. Sauveur
by Langner, Parry, Card + Langner
Attys.

Patented Apr. 5, 1927.

1,623,705

UNITED STATES PATENT OFFICE.

HARRY SAUVEUR, OF BERLIN-LANKWITZ, GERMANY, ASSIGNOR TO THE FIRM: FLEXO-INDUSTRIE-GESELLSCHAFT M. B. H., OF VIENNA, AUSTRIA.

CHUCK.

Application filed May 7, 1925, Serial No. 28,656, and in Germany May 19, 1924.

This invention relates to chucks for tools more particularly for drills of that class, in which a plurality of radially movable jaws and a pressure and guiding element cooperate with the chuck casing to move the jaws radially and to prevent them from turning round their axis and also to prevent them from moving tangentially, relatively to each other for the purpose of securing an exactly centered adjustment. But the adjustment of the jaws is not yet absolutely positive in chucks of this class inasmuch as the jaws may turn as an entirety round the central axis together with the guiding element.

The object of the present invention is to eliminate also this last possibility of movement of the jaws, since a turning of the chuck jaws as an entirety while they are under comparatively heavy pressure would lead to a rapid destruction of the chuck. With this object in view the present invention consists in so constructing the guide and pressure element that it is locked against turning on the chuck but is movable axially in the chuck, this guide and pressure element being provided with slots for receiving the jaws.

Figure 1:
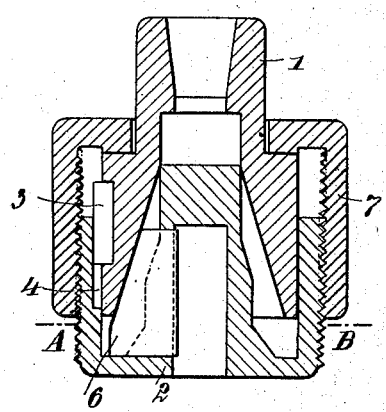
Figure 2:
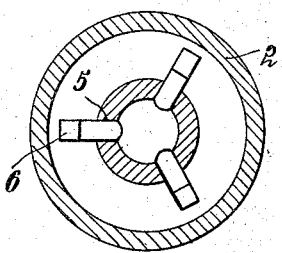

In the annexed drawing Fig. 1 is a vertical section of a preferred constructional form of the improved chuck as applied to a drill. Fig. 2 is a section on the line A, B, Fig. 1.

The body 1 of the chuck is pushed onto the drill spindle with a conical bore and contains a conical chuck bore open at the bottom end, the jaws being adapted to be forced against the side walls of the latter conical bore into which also engages the central part 2 which is provided with an outer flange and resembles a cap nut. The central part 2 is provided with a bore for inserting the tool and is axially movable relatively to the body 1 by a key 3 on the body engaging into a groove 4 in the central part 2, but is prevented from turning in this body. Furthermore the part 2 is provided with slots 5 for receiving the jaws 6. Springs not shown tend to force the jaws outwards against the wall of the chuck bore. The central bore of the part 2 is closed at its upper end so that the tool cannot come into contact with the drill spindle. A cap nut 7 engages over the body 1 from top and serves to force the central part 2 together with the jaws 6 into the chuck cone.

The tool is inserted into the central part 2 whereby the latter is pushed into the body together with the jaws the latter being pressed against the walls of the chuck bore. The cap nut may then be rapidly turned downwards until it comes into contact with the body 1 and then the jaws may be fully locked in position. Any relative movement between the jaws and the chuck cone is thus positively prevented since a relative tangential movement of the parts 1 and 2 is impossible.

What I claim is:

In a bore chuck, the combination of a chuck body, said body being provided with an upwardly tapering axial bore, and with an external shoulder adjacent the upper end of said bore, a central part projecting upwardly into said bore and capable of longitudinal movement therein, said central part being provided at its lower end with an upturned flange, the same surrounding and fitting the lower part of the chuck body, means for preventing the central part from revolving relative to the chuck body, said central part being provided with a central bore and with radial slots opening through the wall thereof into said central bore, said slots being closed at top and bottom, a plurality of jaws each snugly and slidably fitting said slots, and being guided for radial movement therein, the outer edge of said jaws being inclined to the axis of the bore chuck at the same angle as the inner wall of the upwardly tapering axial bore of the chuck body, a cap nut open at the bottom screwable upon the flange of said central part, said nut having an upturned flange at its upper end surrounding said chuck body and engaging the external shoulder thereupon, whereby, by rotation of said cap nut said central portion may be caused to reciprocate within said chuck body for actuating said jaws.

In testimony whereof I have affixed my signature.

HARRY SAUVEUR.